(No Model.)
R. W. DONMOYER.
WHEEL.
No. 396,991. Patented Jan. 29, 1889.
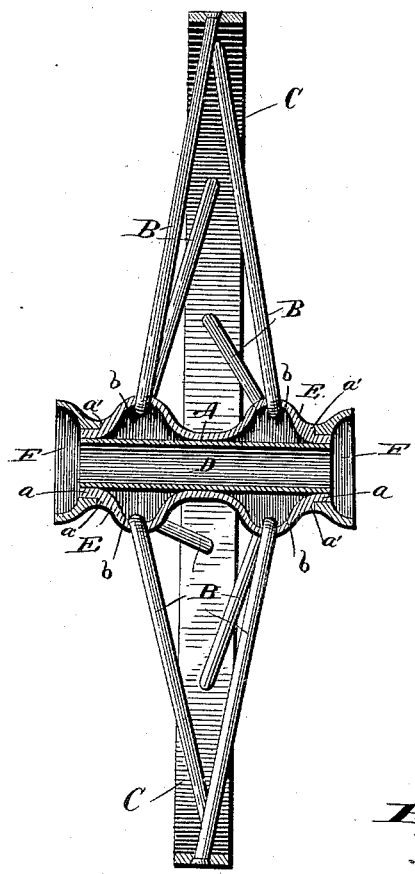
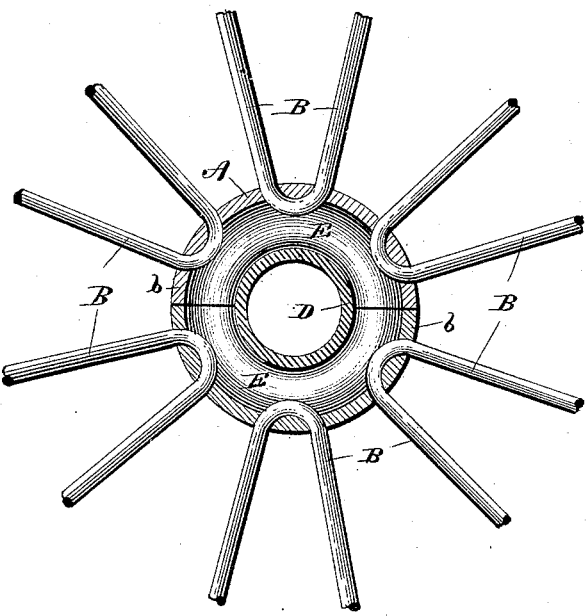
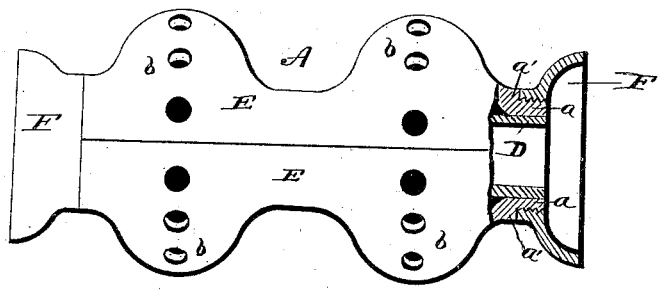
WITNESSES
INVENTOR,
R. W. Donmoyer
By C. M. Alexander
Attorney.

UNITED STATES PATENT OFFICE.

RUDOLPH W. DONMOYER, OF SOUTH BEND, INDIANA.

WHEEL.

SPECIFICATION forming part of Letters Patent No. 396,991, dated January 29, 1889.

Application filed November 5, 1888. Serial No. 289,982. (No model.)

*To all whom it may concern:*

Be it known that I, RUDOLPH W. DONMOYER, a citizen of the United States, residing at South Bend, in the county of St. Joseph and State of Indiana, have invented certain new and useful Improvements in Wheels, of which the following is a specification, reference being had therein to the accompanying drawings, in which—

Figure 1 represents a vertical sectional view of my improved wheel; Fig. 2, a transverse sectional view of my improved hub; and Fig. 3, a detail side elevation of the hub, partly in section.

The object of the invention is to provide a metallic vehicle or other wheel with an improved and extremely light and durable hub that will be of simple and inexpensive construction and readily assembled and taken apart, as will presently appear.

The invention consists in certain novel features of construction and arrangements of parts, that will be fully hereinafter described, and particularly pointed out in the claims appended.

Referring to the drawings by letter, A designates the hub, B the spokes, and C the tire or rim, of the wheel. The hub A consists of an inner sleeve, D, which serves as a bearing for the axle, the two sections E E, semicircular in cross-section and clamped together to form the hub-body proper, and the end caps or rings, F, shrunk or screwed over the shouldered ends of the body-sections E E to clamp them together.

The semi-tubular hub-sections E are provided, as shown, with slightly-reduced extensions $a$ at their ends, forming annular shoulders $a'$. When the sections are placed together and the caps F secured over the reduced portions $a$, abutting against the annular shoulders $a'$, the said sections will be firmly and rigidly bound together. The caps F not only serve to bind the hub-sections together, but they also serve as shields or sandbands. The caps may be shrunk on, as shown in Fig. 1, or screwed on, as shown in Fig. 3, as the exigencies of the case may require. The inner bearing-sleeve, D, may be held in the hub in any suitable manner. For instance, it may be made to fit snugly and be firmly clamped in place by the shrinking of the rings or caps F over the ends of the hubs.

The hub-sections are each provided with semi-annular bulges or enlargements $b$, which, when the sections are put together, form annular spaces between the sleeve and interior of the hub-sections. These annular bulges are formed to receive the inner ends of the spokes, the spokes being usually put in place before the hub is assembled. In the present instance the spokes are formed of bars of round iron, each bar forming two spokes, as shown. The bars are bent midway their length, the two ends of each bar being passed through suitable apertures in the hub-sections and secured to the rim or tire of the wheel in any suitable manner, the inner bent portions of each bar resting in suitable curved grooves or recesses formed in the interior surfaces of the hub-sections.

In the drawings I illustrate a wheel having two annular bulges, $b$, and a double row of spokes; but it is evident that for light wheels I may use but one row of spokes and one bulge.

Having thus fully described my invention, what I claim as new, and desire to secure by Letters Patent, is—

1. The combination of a rim or tire, spokes, and a hub consisting of two semi-tubular sections provided with one or more annular bulges for the reception of the inner ends of the spokes, independent caps or rings secured over the ends of the said sections to clamp them together, and an inner bearing-sleeve, substantially as described.

2. The combination of two semi-tubular hub-sections and two independent caps or rings secured over the ends of said sections, whereby the same are clamped together, substantially as described.

3. The combination of the two semi-tubular sections provided with reduced ends, forming shoulders $a'$, and two independent caps or rings secured over the said reduced ends, substantially as described.

4. The combination of two semi-tubular hub-sections provided with one or more bulges, $b$, and independent caps or rings secured over the ends of the said sections, substantially as described.

5. In a hub, the combination of the two semi-tubular cast-metal sections, provided upon their opposite ends with external screw-threads, and internally-screw-threaded caps screwed over the ends of the said sections, whereby the same are held or clamped securely together, the contiguous longitudinal edges of the sections abutting against each, substantially as described.

In testimony whereof I affix my signature in presence of two witnesses.

RUDOLPH W. DONMOYER.

Witnesses:
 JASPER E. LEWIS,
 JOHN ROTH.